United States Patent [19]
Herbert et al.

[11] Patent Number: 5,319,400
[45] Date of Patent: Jun. 7, 1994

[54] LIGHT-BLOCKING TRANSPARENCY ASSEMBLY

[75] Inventors: Alan J. Herbert, Austin; Dwight L. Evans, Cedar Park; Terrance J. Russell, Round Rock, all of Tex.

[73] Assignee: Minnesota Mining and Manufacturing Company, St. Paul, Minn.

[21] Appl. No.: 1,301

[22] Filed: Jan. 6, 1993

[51] Int. Cl.⁵ .............................................. G03B 21/30
[52] U.S. Cl. .............................. 353/120; 353/DIG. 3
[58] Field of Search .................... 353/120, 97, DIG. 5, 353/DIG. 3; 40/158.1, 159.2, 156

[56] References Cited

U.S. PATENT DOCUMENTS

| | | | |
|---|---|---|---|
| 4,244,511 | 1/1981 | Coleman | 40/156 |
| 4,402,585 | 9/1983 | Gardlund | 353/120 |
| 4,467,541 | 8/1984 | Pettersson | 40/159.2 |
| 4,480,003 | 10/1984 | Edwards et al. | 428/329 |
| 4,869,955 | 9/1989 | Ashcraft et al. | 428/327 |
| 4,956,225 | 9/1990 | Malbotra | 428/216 |
| 5,044,100 | 9/1991 | Roberts et al. | 40/156 |
| 5,104,731 | 4/1992 | Gager | 428/323 |

FOREIGN PATENT DOCUMENTS

| | | | |
|---|---|---|---|
| 0349227 | 1/1990 | European Pat. Off. | G03G 7/00 |
| 0408197 | 1/1991 | European Pat. Off. | G03G 7/00 |
| 0442567 | 8/1991 | European Pat. Off. | G03G 7/00 |

*Primary Examiner*—William A. Cuchlinski, Jr.
*Assistant Examiner*—William C. Dowling
*Attorney, Agent, or Firm*—Gary L. Griswold; Walter N. Kirn; David W. Anderson

[57] ABSTRACT

A sheet of imageable film for use in an overhead projector is provided with at least one, and preferably two, opaque flaps attached in a foldable manner to the film so that the flaps may be unfolded to prevent unwanted light from shining past the edges of the transparency.

18 Claims, 1 Drawing Sheet

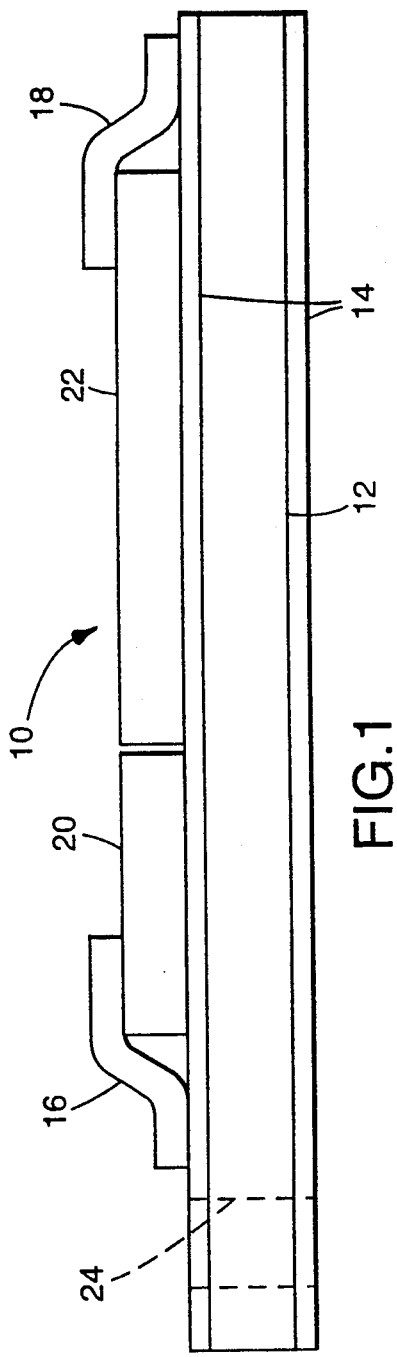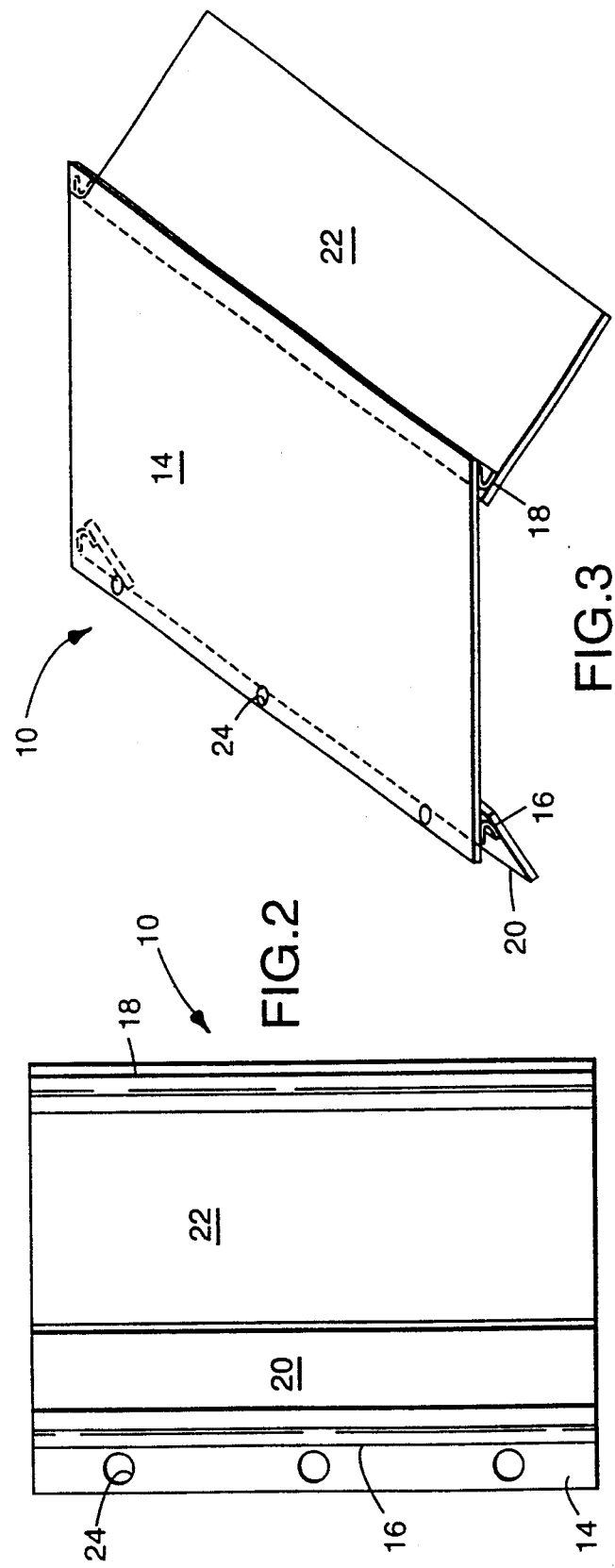

LIGHT-BLOCKING TRANSPARENCY ASSEMBLY

FIELD OF THE INVENTION

The present invention relates to films having an image (transparencies) for use in overhead projectors.

BACKGROUND OF THE INVENTION

Transparencies are transparent or translucent films which may be clear or colored and include textual or graphical data. The data on the transparency may be projected on a distant surface or screen, usually in enlarged form, by an overhead projector so that the data may be observed by a large number of people at once. A typical overhead projector includes a stage upon which the transparency may be placed and light from a source within the projector is directed through the stage and the transparency to a lens system which focusses the light, and an image of the data contained on the transparency, on the distant viewing surface.

The transparency is typically the size of standard letter paper while the stage is of a greater size to accommodate a variety of different possible transparency sizes. Usually this results in light beyond the edges of the transparency being projected to the screen along with the data contained on the transparency. This situation is not a great problem if the transparency is clear, but, if the transparency is colored or translucent, the white light projected from those areas beyond the edges of the transparency is very distracting.

U.S Pat. No. 4,402,585 describes a rectangular envelope which has folding flaps attached to two opposed edges. In use, the transparency is placed within the envelope and the flaps extended to block the light which would otherwise shine past the edges of the transparency. In this fashion, light transmission to the distant viewing surface is limited to that passing through the transparency. These envelopes have proven very successful, but they have the disadvantage that the light must pass through three layers of film, including two comprising the envelope and the transparency itself, which affects the brightness and clarity of the projected image. In addition, the envelope/transparency combination results in a somewhat bulky package.

The transparency itself is most conveniently produced today by the use of a sheet of polymeric film which may have a coating and which can be imaged in a copy machine or laser printer. If a coating is used, it is designed to enhance anchorage of the toner particles used in electrography or xerography to the film. The coating and the film are selected to withstand the temperatures necessary for fusing the toner particles to the transparency sheet.

U.S. Pat. No. 4,480,003 discloses a transparency film for use in plain paper electrostatic copiers. The base of the transparency film is a flexible, transparent, heat resistant polymeric film. An image receiving layer, preferably, a toner-receptive, thermoplastic, transparent polymethyl methacrylate polymer containing dispersed silica particles is coated on a first major surface of the polymeric film. On the second major surface of the film base is coated a layer of non-migratory electrically conductive material, preferably a polymer derived from the reaction of pyrridine and 2 amino-pyrridine with partially chloromethylated polystyrene. It is preferred that a primer coating be interposed between the polymeric film base and the layer of conductive material to provide suitable adhesion of the coating to the film base. It is also preferred that the layer of conductive material be over-coated with a protective coating having additives to control abrasion, resistance, roughness and slip properties. It is disclosed that the sheet can be fed smoothly from a stack and produces clear background areas.

U.S. Pat. No. 4,869,955 discloses an element suitable for preparing transparencies using an electrostatic plain paper copier. The element comprises a polyethylene terephthalate support (polyester), at least one subbing layer coated thereon and, coated to the subbing layer, a toner receptive layer comprising a mixture of an acrylate binder, a polymeric antistatic agent having carboxylic acid groups, a crosslinking agent, butylmethacrylate modified polymethacrylate beads and submicron polyethylene beads. These elements produce excellent transparencies.

U.S. Pat. No. 4,956,225 discloses yet another transparency suitable for electrographic and xerographic imaging comprising a polymeric substrate with a toner receptive coating on one surface thereof. The toner receptive coating comprises blends selected from a group consisting of: poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer; poly(chloroprene) and poly(alpha-methylstyrene); poly(caprolactone) and poly(alpha-methylstyrene); poly(vinyl isobutylether) and poly(alpha-methylstyrene); poly(caprolactone) and poly ($\alpha$-methylstyrene); chlorinated poly(propylene) and poly($\alpha$-methylstyrene); chlorinated poly(ethylene) and poly($\alpha$-methylstyrene); and chlorinated rubber and poly($\alpha$-methylstyrene). Also disclosed are transparencies with first and second coating layers.

EP Application 0349,227 discloses a transparent laminate film for full color image-forming comprising two transparent resin layers. The first resin layer is heat-resistant, and the second resin layer must be compatible with a binder resin constituting the toner to be used for color image formation. The second resin layer has a larger elasticity than that of the binder resin of the toner at a fixing temperature of the toner. The second resin can be of the same "kind" i.e., type, e.g., styrene-type or polyester type, as the toner binder, as long as the resins differ in storage elasticity.

EP 408197A2 discloses an imageable copy film comprising a thermoplastic polymeric film substrate with a widthwise thermal expansion of 0.01 to 1% at 150° C. and a lengthwise thermal shrinkage in the film of 0.4 to 2.0% at 150° C. The substrate has a receiving layer on at least one surface thereof comprising an acrylic and/or methacrylic resin comprising any film-forming resin, e.g., polymers derived from alkyl esters having up to 10 carbon atoms, e.g. methyl, ethyl, n-propyl, isopropyl, n-butyl, isobutyl, tert-butyl, hexyl, 2-ethylhexyl, heptyl and n-octyl. The use of ethylacrylate or butylacrylate together with an alkylmethacrylate is preferred. Other suitable monomers include acrylonitrile, methacrylonitrile, halo substituted acrylonitrile and (meth)acrylonitrile, acrylamide, methacrylamide, n-methylol acrylamide and methacrylamide, n-ethanol acrylamide and methacrylamide, n-propanol acrylamide and methacrylamide, t-butylacrylamide, hydroxyl ethylacrylamide, glycidyl acrylate, and methacrylate, dimethylamino ethyl methacrylate, itaconic anhydride and half ester of itaconic acid. Vinyl monomers such as vinylacetate, vinylchloroacetate, vinyl benzene, vinyl pyrridine, vinyl chloride, vinylidene chloride, maleic acid, maleic anhydride, styrene and substituted styrene, and the like can optionally be included.

EP 442567A2 discloses a medium for electrophotographic printing or copying comprising a polymeric substrate coated with a polymeric coating having a Tukon hardness of about 0.5 to 5.0 and a glass transition temperature of about 5° to 45° C. The coating comprises at least one pigment which provides a coefficient of static friction of from 0.20 to 0.80 and a coefficient of dynamic friction of from 0.10 to 0.40. The medium has improved image quality and toner adhesion. It is particularly useful in laser electrophotographic printing. The polymer employed in the coating can contain thermosetting or thermoplastic resins, and preferably aqueous acrylic emulsions such as Rhoplex TM resins from Rohm and Haas.

U.S. Pat. No. 5,104,731 discloses a dry toner imaging film media having good toner affinity, antistatic properties, embossing resistance and good feedability through electrophotographic copies and printers. The media comprises a suitable polymeric substrate with an antistatic matrix layer coated thereon. The matrix layer has resistance to blocking at 78° C. after 30 minutes and a surface resistivity of from about $1 \times 10^8$ to about $1 \times 10^{14}$ ohms per square at 20° C. and 50% relative humidity. The matrix contains one or more thermoplastic polymers having a $T_g$ of 5° C. to 75° C., and at least one crosslinked polymer which is resistant to hot roll fuser embossing, at least one of the polymers being electrically conductive.

U.S. patent application Ser. No. 947,252 to Ali et. al., filed Sep. 18, 1992 and assigned to the assignee of the present invention, discloses another film and coating which is useful in making transparencies in a standard copy machine or laser printer. The subject matter of this patent application is described in greater detail below. This patent application, U.S. Pat. No. 4,402,585 and the patents and patent applications described above relating to the production of transparency in a copy machine or laser printer are hereby incorporated by reference.

SUMMARY OF THE INVENTION

The present invention combines the advantages of the transparency envelope described in U.S. Pat. No. 4,402,585 and the teachings of the documents related to electrographic imageable transparency film to provide a light-blocking transparency assembly comprising a rectangular sheet of transparency film directly imageable by machines employing electrographic or xerographic imaging processes, or devices such as ink jet printers, thermal mass transfer printers or plotters employing other imaging means, and at least one opaque flap attached in a foldable manner to the film, with the folded position being that position wherein the flap extends from its attachment edge to the sheet toward the larger portion of the sheet, the flap and film being capable of passage through the electrographic, xerographic or other imaging means without substantial deterioration.

BRIEF DESCRIPTION OF THE DRAWINGS

The present invention will be more thoroughly described with reference to the accompanying drawings wherein like numbers refer to like parts in the several view, and wherein:

FIG. 1 is an elevational view of a light-blocking transparency assembly according to the present invention;

FIG. 2 is a plan view of the transparency assembly of FIG. 1; and

FIG. 3 is a perspective view of the transparency assembly of FIG. 1.

DESCRIPTION OF THE PREFERRED EMBODIMENT

FIG. 1 illustrates a light-blocking transparency assembly, generally indicated a 10, which includes a film substrate 12 coated at least on one side (coating on both sides is illustrated) by an imaging coating 14, preferably including a copolymer and a polymeric particulate as described below. Attached to the substrate 12 by means of hinges 16 and 18 are light-blocking flaps 20 and 22.

According to U.S. patent application Ser. No. 947,252 to Ali et. al., filed Sep. 18, 1992, the preferred imaging coating 14 includes about 65 to about 99.5 parts of an imaging copolymer containing from about 80 parts to about 99 parts of at least one monomer selected from the group consisting of bicyclic alkyl (meth)acrylates, aliphatic alkyl (meth)acrylates having from about one to about twelve carbon atoms, and aromatic (meth)acrylates.

Copolymers containing at least one bicyclic alkyl (meth)acrylate are preferred for use with most commercial copiers, as they improve the adhesion of toner to the image receptive coating. Useful bicyclic (meth)acrylates include, but are not limited to, dicyclopentenyl (meth)acrylate, norbornyl (meth)acrylate, 5-norborene-2-methanol, and isobornyl (meth)acrylate. Preferred bicyclic monomers include dicyclopententyl (meth)acrylate, and isobornyl (meth)acrylate. Useful aliphatic alkyl (meth)acrylates include, but are not limited to, methyl acrylate, ethyl acrylate, methyl (meth)acrylate, isobutyl (meth)acrylate, isodecyl (meth)acrylate, cyclohexyl (meth)acrylate, and the like. Preferred aliphatic monomers include methyl (meth)acrylate, ethyl (meth)acrylate, and isodecyl (meth)acrylate.

For imaging polymers to be emulsion polymerized, the bicyclic alkyl (meth)acrylates preferably comprise from about 10 parts to about 80 parts, more preferably from 20 parts to about 60 parts. For solution polymers, the preferred minimum amount is lower, i.e., about 5 parts, more preferably about 10 parts.

Most copiers have a styrene based toner system; the addition of styrene and substituted styrene monomers yield imaging sheets having very good toner adhesion with such machines.

The copolymer must also contain from about 1 to about 20 parts of a polar monomer having the formula:

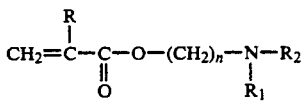

wherein R is hydrogen or methyl, $R_1$ and $R_2$ is selected from the group consisting of hydrogen, identical, and differing alkyl groups having up to about 8 carbon atoms, preferably up to about 2 carbon atoms; the N-group can also comprise a cationic salt thereof.

Useful examples include N,N-dialkyl monoalkyl amino ethyl (meth)acrylate, and N,N-dialkyl monoalkyl amino methyl (meth)acrylate, N-butyl amino ethyl (meth)acrylate, and the like for emulsion polymers, and quaternary ammonium salts thereof for solution polymers. Preferred monomers include N,N'-diethylaminoethyl(meth)acrylate, and N,N'-dimethylaminoethyl(meth)acrylate for emulsion polymers and bromoethanol salts of N,N'-dimethyl aminoethyl(meth)acrylate, and N,N'-diethyl aminoethyl(meth)acrylate for solution polymers. The presence of these polar monomers improves the adhesion of the toner receptive imaging coating 14 to the transparent film substrate or backing.

Preferred copolymers comprise at least two monomers selected from aliphatic alkyl (meth)acrylate monomers and bicyclic alkyl (meth)acrylates.

The imaging coating 14 includes the copolymer described above in combination with about 0.1 to 15 parts of at least one novel polymeric microspheres produced from diol di(meth)acrylate homopolymers which impart antifriction characteristics when coated on image recording sheets. These diol di(meth)acrylates can be reacted with long-chain fatty alcohol esters of (meth)acrylic acid.

Specifically the microspheres comprise at least about 20 percent by weight polymerized diol di(meth)acrylate having a formula

$$CH_2=CR_2COOC_nH_{2n}OOCCR_2=CH_2$$

wherein $R_2$ is hydrogen or a methyl group, and n is an integer from about 4 to about 18. Examples of these monomers include those selected from the group consisting of 1,4-butanediol di(meth)acrylate, 1,6-hexanediol di(meth)acrylate, 1,8-octanediol di(meth)acrylate, 1,10-decanediol di(meth)acrylate, 1,12-dodecanediol di(meth)acrylate, 1,14-tetradecanediol di(meth)acrylate, and mixtures thereof.

Preferred monomers include those selected from the group consisting of 1,4-butanediol di(meth)acrylate, 1,6 hexanediol di(meth)acrylate, 1,12-dodecanediol di(meth)acrylate, and 1,14-tetradecanediol di(meth)acrylate.

The microspheres may contain up to about 80 weight percent of at least one copolymerized vinyl monomer having the formula

$$CH_2=CR_2COOC_mH_{2m+1}$$

wherein $R_2$ is hydrogen or a methyl group and m is an integer of from about 12 to about 40.

Useful long-chain monomers include, but are not limited to lauryl (meth)acrylate, octadecyl (meth)acrylate, stearyl (meth)acrylate, and mixtures thereof, preferably stearyl (meth)acrylate.

The microspheres may optionally contain up to about 30 percent by weight of at least one copolymerized ethylenically unsaturated monomer selected from the group consisting of vinyl esters such as vinyl acetate, vinyl propionate, and vinyl pivalate; acrylic esters such as methacrylate, cyclohexylacrylate, benzylacrylate, isobornyl acrylate, hydroxybutylacrylate and glycidyl acrylate; methacrylic esters such as methyl methacrylate, butyl methacrylate, cyclohexyl methacrylate, benzyl methacrylate, γ-methacryloxypropyl trimethoxysilane, and glycidyl methacrylate; styrene; vinyltoluene; α-methyl styrene, and mixtures thereof. Most preferred beads include 50/50 poly(hexanediol-diacrylate/stearyl methacrylate), and 50/50 poly(butanedioldiacrylate)/lauryl(meth)acrylate, 80/20 poly(hexanedioldiacrylate)/stearyl(meth)acrylate, 50/50 polymethylmethacrylate/1,6 hexanedioldiacrylate, $C_{14}$ dioldiacrylate, and $C_{12}$ dioldi(meth)acrylate.

In addition to the above, beads of the present invention may also optionally comprise additives which are not ethylenically unsaturated, but which contain functional groups capable of reacting with materials containing reactive groups which may also be coated on the substrate along with the anti-friction beads. Such additives are useful in modifying the degree of interaction or bonding between the beads and the imaging polymer. Suitable examples include organosilane coupling agents having alkyl groups with 1 to about 8 carbon atoms, such as glycidoxy trimethoxysilanes such as γ-glycidoxypropyltrimethoxysilane, and (aminoalkylamino) alkyl trimethoxysilanes such as 3-(2-amino ethyl amino) propyl trimethoxysilane.

For good feedability, the mean particle size preferably ranges from about 0.25 μm to about 15 μm. Particles smaller than 0.25 μm would require the use of more particles to produce an effective coefficient of friction, this would tend to also produce more haze. Larger particles than 15 μm would require thicker coatings to anchor the particles firmly in the coatings, which would increase haze and coating cost. For good performance, the particles preferably have narrow particle size distributions, i.e., a standard deviation of up to 20% of the average particle size. These ranges are preferably 0.1-0.7 μm, 1-6 μm, 3-6 μm, 4-8 μm, 6-10 μm, 8-12 μm, 10-15 μm. More preferred particles are those having bimodal particle size distributions. This is made by mixing particles having 2 different particle size distributions such as particles having a distribution of sizes from 1-4 μm mixed with 6-10 μm. When bimodal particles are used, both particles can be selected from the preferred novel polymeric beads described above, or one of the particles can be selected from such preferred beads and one selected from other beads such as PMMA and polyethylene beads, the second type of bead also preferably having a narrow particle size distribution.

Most preferably, both bimodal particles are selected from beads produced from the copolymer of hexanedioldiacrylate and stearylmethacrylate, having particle size distributions of from about 1 to about 4 μm and from about 6 to about 10 μm, or from about 2 to about 6 μm and from about 8 to about 12 μm, or from about 0.20 to 0.5 μm and from about 1-6 μm.

Coatings 14 for the transparency film assemblies 10 useful for copying devices typically range in thickness from 100 nm to 1500 nm, preferably 200 nm to 500 nm. If large particles are used, then the coating thickness must be increased accordingly to ensure that enough coating material is present to anchor the particles onto the transparent substrate, while the coating thickness can be correspondingly lowered for smaller particles. Hence the most preferred particle size distributions chosen reflect more on the coating thickness than the feeding performance of other larger particle sizes and vice versa.

The microspheres are polymerized by means of conventional free-radical polymerization, e.g., those suspension polymerization methods described in U.S. Pat. No. 4,952,650, and 4,912,009, incorporated herein by reference, or by suspension polymerization using a surfactant as the suspending agent, and use those initiators normally suitable for free-radical initiation of acrylate monomers. These initiators include azo compounds such as 2,2-azobis, 2-methyl butyronitrile and 2,2-azobis (isobutyronitrile); and organic peroxides such as benzoylperoxide and lauroylperoxide. For submicron beads, suspension polymerization is used wherein the suspending agent is a surfactant.

An antistatic agent may also be present in the imaging coating 14 layer. Useful agents are selected from the group consisting of nonionic antistatic agents, cationic agents, anionic agents, and fluorinated agents. Useful agents include such as those available under the trade name AMTER TM, e.g., AMTER TM 110, 1002, 1003, 1006, and the like, derivatives of Jeffamine TM ED-4000, 900, 2000 with FX8 and FX10, available from 3M, Larostat TM 60A, and Markastat TM AL-14, available from Mazer Chemical Co., with the preferred antistatic agents being steramidopropyldimethyl-$\beta$-hydroxyethyl ammonium nitrate, available as Cyastat TM SN, N,N'-bis(2-hydroxyethyl)-N-(3'-dodecyloxy-2'2-hydroxylpropyl) methylammonium methylsulfate, available as Cyastat TM 609, both from American Cyanamid. When the antistatic agent is present, amounts of up to 20% (solids/solids) may be used. Preferred amounts vary, depending on coating weight. When higher coating weights are used, 1–10% is preferred, when lower coating weights are used, 5–15% is preferred. Where emulsion polymerization of the image polymer layer is desired, an emulsifier must also be present. These include nonionic, or anionic emulsifiers, and mixtures thereof, with nonionic emulsifiers being preferred. Suitable emulsifiers include those having a HLB of at least about 10, preferably from about 12 to about 18. Useful nonionic emulsifiers include $C_{11}$ to $C_{18}$ polyethylene oxide ethanol, such as Tergitol TM, especially those designated series "S" from Union Carbide Corp, those available as Triton TM from Rohm and Haas Co., and the Tween TM series available from ICI America. Useful anionic emulsifiers include sodium salts of alkyl sulfates, alkyl sulfonates, alkylether sulfates, oleate sulfates, alkylarylether sulfates, alkylarylpolyether sulfates, and the like. Commercially available examples include such as those available under the trade names Siponate TM and Siponic TM from Alcolac, Inc. When used, the emulsifier is present at levels of from about 1% to about 7%, based on polymer, preferably from about 2% to about 5%.

Additional wetting agents with HLB values of 7–10 may be present in the emulsion to improve coatability. These additional surfactants are added after polymerization is complete, prior to coating of the polymeric substrate. Preferred additional wetting agents include fluorochemical surfactants such as

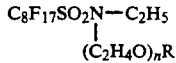

wherein n is from about 6 to about 15 and R can by hydrogen or methyl. Useful examples include FC-170C and FC-171. available from 3M. Another useful wetting agent is Triton TM X-100, available from Union Carbide.

Addition of a coalescing agent is also preferred for emulsion based image coating layers 14 to insure that the coated material coalesces to form a continuous and integral layer and will not flake in conventional copiers under copying and fixing conditions. Compatible coalescing agents include propylcarbitol, available from Union Carbide as the Carbitol TM series, as well as the Cellusolve TM series, Propasolve TM series, Ektasolve TM and Ektasolve series of coalescing agents, also from Union Carbide. Other useful agents include the acetate series from Eastman Chemicals Inc., the Dowanol TM E series, Dowanol TM E acetate series, Dowanol TM PM series and their acetate series from Dow Chemical, N-methyl-2-pyrolidone from GAF, and 3-hydroxy-2,2,4-trimethyl pentyl isobutryate, available as Texanol TM, from Eastman Chemicals Inc. These coalescing agents can be used singly or as a mixture.

Other optional ingredients may be present in the image-forming coating polymer 14 for the purposes of improving coatability, or other features. Useful additives include such as crosslinking agents, catalysts, thickeners, adhesion promotors, glycols, defoamers and the like.

One preferred optional ingredient in the emulsion polymerized embodiment of the invention is an additional adhesion promotor to enhance durability of thicker coatings to the substrate. Useful adhesion promotors include organofunctional silanes having the following general formula:

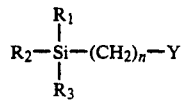

wherein $R_1$, $R_2$, and $R_3$ are selected from the group consisting of an alkoxy group and an alkyl group with the proviso that at least one alkoxy group is present, n is an integer from 0 to 4, and Y is an organofunctional group selected from the group consisting of chloro, methacryloxy, amino, glycidoxy, and mercapto. Useful silane coupling agents include such as $\gamma$-aminopropyl trimethoxysilane, vinyl triethoxy silane, vinyl tris($\beta$-methoxy ethoxy)-silane, vinyl triacetoxy silane,$\gamma$-methacryloxypropyltrimethyoxy silane, $\gamma$-($\beta$-amino ethyl)aminopropyl trimethoxysilane, and the like. The adhesion promotor may be present at levels of from about 0.5 to about 15% of the total resin, preferably from about 4% to about 10%.

The transparency assembly 10 of the invention may also comprise an ink-permeable protective layer such as polyvinyl alcohol, and the like, to insure faster drying.

Also in accordance with the preferred construction according to U.S. patent application Ser. No. 947,252 to Ali et. al., filed Sep. 18, 1992, film substrates 12 may be formed from any polymer capable of forming a self-supporting sheet, e.g., films of cellulose esters such as cellulose triacetate or diacetate, polystyrene, polyamides, vinyl chloride polymers and copolymers, polyolefin and polyallomer polymers and copolymers, polysulphones, polycarbonates, polyesters, and blends thereof. Suitable films 12 may be produced from polyesters obtained by condensing one or more dicarboxylic acids or their lower alkyl diesters in which the alkyl group contains up to about 6 carbon atoms, e.g., terephthalic acid, isophthalic, phthalic, 2,5-,2,6-, and 2,7-naphthalene dicarboxylic acid, succinic acid, sebacic acid, adipic acid, azelaic acid, with one or more glycols such as ethylene glycol, 1,3-propanediol, 1,4-butanediol, and the like.

Preferred film substrates 12 are cellulose triacetate or cellulose diacetate, polyesters, especially polyethylene terephthalate, and polystyrene films. Polyethylene terephthalate is most preferred. It is preferred that film substrates 12 have a caliper ranging from about 50 $\mu$m to about 150 μm. Film substrates 12 having a caliper of less than about 50 μm are difficult to handle using conventional methods for graphic materials. Film substrates 12 having calipers over 150 μm are very stiff, and present feeding difficulties in certain commercially available copying machines.

When polyester film substrates 12 are used, they can be biaxially oriented to impart molecular orientation before the imaging layer 14 is coated thereon, and may also be heat set for dimensional stability during fusion of the image to the support. These films 12 may be produced by any conventional extrusion method.

In some embodiments, the polyester film is extruded or cast, and uniaxially oriented in the machine direction. The imaging layer 14 is then coated thereon. The composite can then undergo further orientation in the transverse direction to produce a finished product. When this process is used, the coated layer exhibits evidence of such stretching under optical microscopy, but surprisingly, the coating remains transparent, and the polymer, whether emulsion or solution polymerized, exists in a continuous coated layer without voids, thus showing the high integrity and cohesiveness of the coated layer.

To promote adhesion of the coating layer 14 to the film substrate 12, it may be desirable to treat the surface of the film substrate 12 with one or more primers, in single or multiple layers. Useful primers include those known to have a swelling effect on the substrate 12 polymer. Examples include halogenated phenols dissolved in organic solvents. Alternatively, the surface of the film substrate 12 may be modified by treatment such as corona treatment or plasma treatment.

The primer layer, when used, should be relatively thin, preferably less than 2 μm, most preferably less than 1 μm, and may be coated by conventional coating methods.

Two opaque, substantially rectangular elongated flaps 20 and 22 are attached in a foldable manner adjacent the outer longitudinal edges of the substrate 12. The flaps 20, 22 may be, and preferably are, made from a material which accepts text written by conventional writing instruments. Preferred materials are polyvinyl chloride film, polyester (PET) film, paper or paper card stock. The flaps 20, 22 are attached to the substrate 12 by the hinges 16, 18 which may be flexible adhesive tapes of such materials as woven or non-woven fabrics or polymers coated with adhesives, preferably pressure-sensitive adhesives. If the material of the hinges is a suitable polymer, the hinges 16 and 18 may be attached to the flaps 20, 22 and the substrate 12 by such means as heat sealing, sonic welding, solvent welding or heat welding. Naturally, the flaps 20, 22 can be connected to the substrate in some other manner, provided that is produces a hinge effect.

Although the flaps 20, 22 may be attached to the extreme edges of the substrate 12, it is preferred that the flaps 20, 22 be attached inwardly of the edges of the substrate 12. The purpose of the flaps 20, 22 is to block light produced by the projector which would otherwise shine past the edges of the transparency to be projected on the viewing screen. If the transparency were clear in that it was not colored and was transparent, light shining past its edges would not be objectionable. If, however, the transparency is tinted a color, or was somewhat less than entirely transparent, the light shining past its edges would cause a bright, white border which could be very distracting. The flaps 20, 22 are designed to be used as shown in FIG. 3 to block light from shining past the longitudinal edges of the transparency.

The flaps 20, 22 are attached inwardly from the edges of the substrate 12 to ensure that no light escapes beyond the edges of the substrate 12. Particularly if the substrate 12 is provided with holes 24 for storage of the transparency assembly 10 in a binder or the like, the position of the attached flap 20 or 22 adjacent the holes 24 is critical. As will be clear from the Figures, the flap 20 at that longitudinal side edge of the substrate 12 which is provided with punched holes 24, must be spaced from the longitudinal side edge of the substrate 12 so that the holes 24 are exposed in the folded-together state of the flaps 20, 22 to permit storage of the transparency assembly 10 in a binder, file or the like. In the unfolded state the flap 20 adjacent the holes 24 covers these holes 24 so that they are not projected onto the screen on presentation.

In the unfolded state the substrate 12 and flaps 20, 22 have a surface area greater than that of the stage of the overhead projector so that said stage is entirely covered by the expanded transparency assembly 10. Also, it is desirable that the substrate 12 and its imageable coating 14 extend beyond the hinged edges of the flaps 20, 22 so that the total imaged area is larger than that exposed when the flaps 20, 22 are unfolded to expose the portion of the image which is to be projected. This will prevent illumination gaps from arising on one or both sides of the imaged portion of the substrate when it is projected onto the screen.

Although the flaps have been illustrated as substantially abutting each other in the folded position, it is possible that the flaps only cover a portion of the substrate 12 when folded. If the substrate 12 is a material which is designed and expected to be imaged in an electrographic or xerographic machine such as a plain-paper copy machine or a laser printer, it is desirable that the flaps substantially meet so that a solid and continuous surface is provide the substrate 12 in its passage through the machine. Such continuous support improves the uniformity of the image. If the transparency assembly 10 is to be used in a copy machine or laser printer, it is also desirable that the assembly 10 include a strip or strips of adhesive tape to hold the flaps 20, 22 in the closed position during passage of the assembly 10 through the machine. This tape should preferably be of the low adhesion type so that the surfaces of the flaps 20, 22 are not damaged by removal of the tape.

The invention has been particularly described with respect to films designed to accept images directly from electrographic or xerographic means such a plain-paper copy machines or laser printers. It should be understood, however, that any film, whether coated or not, which will accept indicia produced by other means such as pencils, writing pens and so forth in graphite, inks or paints or which is imageable by other means such as infrared radiation could be used as well. As specific examples, uncoated polyester will accept a toner image, although the toner is not retained as well as on the coated film embodiment described above. Also, U.S. Pat. No. 4,686,549 incorporated herein by reference, describes a film particularly useful in thermal mass transfer printing and U.S. Pat. No. 4,379,804 also incorporated by reference, describes a coated film particularly useful in accepting inks.

Many further modifications are possible within the scope of the invention. For example, it is possible that the flaps be of many different shapes. It is, however, essential that they mask the illumination gaps which would otherwise occur on one or both sides of the substrate 12. In another example of possible modifications, the flaps 20, 22 may be of unequal widths as shown in the Figures, or the may be equal in width. Only one large flap 20 attached adjacent the hole 24 side of the substrate 12 could be provided. In this case, the edge of the substrate opposite the flap 20 would be positioned at or overlapping one side of the projector stage and the flap 20 would be used to cover the gap between the other edge of the substrate 12 and the edge of the stage. This variation and others are described in detail in U.S. Pat. No. 4,402,585.

We claim:

1. A light-blocking transparency assembly for use with an overhead projector comprising:
   a single substantially rectangular sheet of transparency film having two major surfaces and two longitudinal edges connected by shorter side edges;
   an imaging coating covering substantially all of at least one major surface of said transparency film and defining an imaging area, said imaging coating being capable of accepting an image intended for projection by an overhead projector; and
   at least one opaque flap attached in a foldable manner adjacent one longitudinal edge of said film and covering substantially all of said imaging area, with the folded position being that position wherein said flap extends from its attachment to said sheet toward the larger portion of said sheet.

2. A light-blocking transparency assembly according to claim 1 wherein said film is imageable by electrographic or xerographic means and said flap is capable of passage through said electrographic or xerographic means.

3. A light-blocking transparency assembly according to claim 2 wherein said flap is spaced from said longitudinal edge of said film such that in the unfolded position the flap covers said longitudinal edge of said film and in the folded position said flap exposes said edge.

4. A light-blocking transparency assembly according to claim 1 including two flaps, one of which is attached adjacent each longitudinal edge of said sheet.

5. A light-blocking transparency assembly according to claim 4 wherein said flaps substantially abut each other when in the folded position.

6. A light-blocking transparency assembly according to claim 5 wherein at least one of said flaps is spaced from its associated longitudinal edge of said film such that in the unfolded position the flap covers said longitudinal edge of said film and in the folded position said flap exposes said longitudinal edge.

7. A light-blocking transparency assembly according to claim 5 further including a strip of adhesive tape connecting said flaps and maintaining said flaps in the folded position.

8. A light-blocking transparency assembly according to claim 1 wherein said imaging coating is a toner-receptive coating comprising:
   a) from about 65 to about 99.9 parts of an imaging copolymer formed from
      1) from about 80 to about 99 parts of at least one monomer selected from the group consisting of bicyclic alkyl (meth)acrylates, aliphatic alkyl (meth)acrylates having from about one to about 12 carbon atoms, and aromatic (meth)acrylates, and
      2) from about 1 to about 20 parts of a polar monomer selected from N,N-dialkyl, monoalkyl amino alkyl acrylate, and N,N-dialkyl, monoalkyl amino alkyl acrylate, and N,N-dialkyl, monoalkyl amino alkyl methacrylate, and quaternary ammonium salts thereof,
   b) from about 0.1 to about 15 parts of at least one polymeric particle comprising
      1) at least about 20 parts polymerized diol di(meth)acrylate having a formula

wherein $R^2$ is hydrogen or a methyl group, and n is an integer from about 4 to about 18,
      2) from 0 to about 80 parts of at least one copolymerized vinyl monomer having the formula

wherein $R^2$ is hydrogen or a methyl group and m is an integer of from about 12 to about 40, and
      3) from 0 to about 30 parts of at least one copolymerized ethylenically unsaturated monomer selected from the group consisting of vinyl esters, acrylic esters, methacrylic esters, styrene, derivatives thereof, and mixtures thereof, totalling 100 parts, and
   c) from 0 to about 20 parts of an antistatic agent selected from the group consisting of cationic agents, anionic agents, fluorinated agents, and nonionic agents.

9. A light-blocking transparency assembly according to claim 8 wherein the imaging copolymer comprises a monomer selected from isobornyl acrylate, isobornyl methacrylate, dicyclopentenyl acrylate, dicyclopentenyl methacrylate, phenoxy acrylate, and phenoxy methacrylate.

10. A light-blocking transparency assembly according to claim 8 wherein said imaging copolymer comprises an aliphatic alkyl acrylate selected from the group consisting of methyl acrylate, ethyl acrylate, methyl methacrylate, ethyl methacrylate, isobutyl acrylate, isobutyl methacrylate, isodecyl methacrylate, and isobutyl acrylate.

11. A light-blocking transparency assembly according to claim 8 wherein said imaging copolymer further comprises a monomer selected from the group consisting of styrene, substituted styrene and vinyl esters.

12. A light-blocking transparency assembly according to claim 8 wherein said polar monomer is selected from the group consisting of dimethyl aminoethylmethacrylate, diethylaminoethylmethacrylate, the bromoethanol salt of dimethyl aminoethylmethacrylate, and the bromoethanol salt of diethylaminoethyl-methacrylate.

13. A light-blocking transparency assembly according to claim 8 wherein the antistatic agent is selected from the group consisting of steramido-propyldimethyl-β-hydroxy-ethyl ammonium nitrate, N,N'-bis(2-hydroxyethyl)-N-(3'-dodecyloxy-2'2-hydroxylpropyl(-methylammonium methylsulfate, and mixtures thereof.

14. A light-blocking transparency assembly according to claim 8 wherein said polymeric particle is selected from the group consisting of a 50/50 poly(hexanediol-diacrylate/stearyl methacrylate) particle, a 50/50 poly(butanedioldiacrylate)/lauryl(meth)acrylate particle, an 80/20 poly(hexanedioldiacrylate)/stearyl(-meth)acrylate particle, a 50/50 polymethylmethacrylate/1,6 hexanedioldiacrylate particle, a $C_{14}$ dioldiacrylate particle, and a $C_{12}$ dioldi(meth)acrylate particle.

15. A light-blocking transparency assembly according to claim 8 wherein said polymeric particle contains from about 50 to about 80 parts hexanedioldiacrylate and from about 50 to about 30 parts stearylmethacrylate, said particle having an average particle size of from about 0.25 μm to about 15 μm.

16. A light-blocking transparency assembly according to claim 15 wherein an additional particle is also present, said additional particle having an average particle size of from about 0.25 μm to about 15 μm, said additional particle having an average particle size at least about 4 μm from the average particle size of said novel polymeric particle.

17. A light-blocking transparency assembly according to claim 16 wherein said additional particle is a copolymer of hexanedioldiacrylate and stearylmethacrylate.

18. A light-blocking transparency assembly according to claim 16 wherein said additional particle comprises polymethylmethacrylate.

* * * * *

UNITED STATES PATENT AND TRADEMARK OFFICE
CERTIFICATE OF CORRECTION

PATENT NO.    :  5,319,400

DATED         :  June 7, 1994

INVENTOR(S)   :  Alan J. Herbert, Dwight L. Evans and Terrance J. Russell

It is certified that error appears in the above-identified patent and that said Letters Patent is hereby corrected as shown below:

Column 12, Lines 4-5: "alkyl acrylate, and N,N-dialkyl, monoalkyl amino alkyl methacrylate" should read -- alkyl methacrylate, --.

Signed and Sealed this

Thirtieth Day of August, 1994

Attest:

BRUCE LEHMAN

Attesting Officer

Commissioner of Patents and Trademarks